United States Patent [19]

Waku et al.

[11] Patent Number: 5,484,752
[45] Date of Patent: Jan. 16, 1996

[54] CERAMIC COMPOSITE MATERIAL

[75] Inventors: Yoshiharu Waku; Hideki Ohtsubo; Yasuhiko Kohtoku, all of Ube, Japan

[73] Assignee: Ube Industries, Ltd., Yamaguchi, Japan

[21] Appl. No.: 335,919

[22] Filed: Nov. 8, 1994

[30] Foreign Application Priority Data

| Nov. 12, 1993 | [JP] | Japan | 5-317242 |
| Nov. 12, 1993 | [JP] | Japan | 5-317243 |
| Jul. 15, 1994 | [JP] | Japan | 6-193470 |
| Jul. 15, 1994 | [JP] | Japan | 6-193471 |

[51] Int. Cl.$^6$ .................................................. C04B 35/10
[52] U.S. Cl. ...................... 501/127; 501/126; 501/152; 501/153
[58] Field of Search .................................. 501/126, 127, 501/153, 152

[56] References Cited

U.S. PATENT DOCUMENTS 3,653,432  4/1972  Schmid et al. .......................... 117/83
4,837,187  6/1989  Frank et al. ............................. 501/127

OTHER PUBLICATIONS

J. Am. Ceram. Soc. vol. 76 No. 1 (1993), "Deformation Behavior of an $Al_2O_3$–$Y_3Al_5O_{12}$ Eutectic Composite . . . ", Parthasarathy, et al., pp. 29–32.

Journal of Materials Science 4 (1969), "Eutectic Solidification in the System $Al_2O_3$/$Y_3Al_5O_{12}$". Viechnicki, et al., pp. 84–89.

Chemical Abstracts, vol. 116, No. 6, Feb. 10, 1992, Kawakami "Directional Solidification of the Alumina–Ytrrium Aluminium Garnet". . .

*Primary Examiner*—Mark L. Bell
*Assistant Examiner*—Michael Marcheschi
*Attorney, Agent, or Firm*—Burgess, Ryan and Wayne

[57] ABSTRACT

A novel ceramic composite material consisting of single crystal $\alpha$-$Al_2O_3$ and polycrystal $Y_3Al_5O_{12}$ and a ceramic composite material consisting of polycrystal $\alpha$-$Al_2O_3$ and polycrystal $Y_3Al_5O_{12}$, each having a high mechanical strength and creep behavior particularly at high temperature are provided.

7 Claims, 7 Drawing Sheets

CERAMIC COMPOSITE MATERIAL

BACKGROUND OF THE INVENTION

1. Field of the Invention

The present invention relates to a ceramic composite material which has a high mechanical strength and an excellent creep resistance in a wide temperature range from room temperature to high temperature and is suitable to be used as a structural material at a high temperature.

2. Description of the Related Art

SiC or $Si_3N_4$ has been investigated to develop ceramic materials to be used at high temperatures but is not sufficient in high temperature properties. As an alternative material thereof, SiC/SiC composite materials produced by chemical vapor impregnation, provided by Societe Europeene de Propulsion, have attracted attention, at the present are considered to be the best high temperature structural materials and have been investigated and developed. The temperature range at which they can be used is reported to be 1400° C. or lower.

T. Parthasarathy et al. in Journal of the American Ceramics Society Vol. 76, No. 1, pp 29–32 (1993) disclosed a composite of alumina and yttrium aluminum garnet (sometime hereinafter referred to as "YAG") of eutectic $Al_2O_3$-$Y_3Al_5O_{12}$. T. Parthasarathy et al. also disclose a method of producing the composite by unidirectionally melting and solidifying a mixed powder of $Al_2O_3$ and $Y_2O_3$ in a crucible.

It is comprehensible from the description on page 29, right column, lines 9 to 10 and FIGS. 1 and 2 of the literature that the composite is polycrystalline and includes grain boundaries. This is clearly supported from the description "The failure was usually along the colony boundaries with crack running along the $Al_2O_3$-YAG interface boundaries". These colony boundaries are shown as portions where the microstructure is larger than in the other portions in FIG. 2 of the literature.

This composite material has stresses equivalent to those of sapphire at 1530° C. and 1650° C. when the strain rate was made constant.

Moreover, the present investors confirmed in experiments that the composite disclosed by Mr. Parthasarathy et al. includes pores or voids in the microstructure and the mechanical strength of the composite rapidly lowers at high temperature.

Therefore, the object of the present invention is to provide a ceramic composite material comprising polycrystal $\alpha$-$Al_2O_3$ and polycrystal $Y_3Al_5O_{12}$ and a ceramic composite material comprising single crystal $\alpha$-$Al_2O_3$ and polycrystal $Y_3Al_5O_{12}$, which have an excellent mechanical strength and creep behavior from room temperature to high temperature and significantly improved these properties particularly at high temperature.

SUMMARY OF THE INVENTION

The above object is attained in accordance with the present invention by providing a composite material consisting essentially of single crystal $\alpha$-$Al_2O_3$ and polycrystal $Y_3Al_5O_{12}$ (YAG) without a colony and having a three point bending strength at 1500° C. in air of at least 600 MPa and/or a compression creep strength at 1600° C. in air of at least 500 MPa and by providing a composite material consisting essentially of polycrystal $\alpha$-$Al_2O_3$ and polycrystal $Y_3Al_5O_{12}$ without a colony and having a three point bending strength at 1500° C. in air of at least 500 MPa.

BRIEF DESCRIPTION OF THE INVENTION

DESCRIPTION OF THE PREFERRED EMBODIMENTS

The term "single crystal" used in the specification means the crystal structure in which only a diffraction peak from a certain crystal plane of $\alpha$-$Al_2O_3$ is observed in an X-ray diffraction of the composite material.

The term "polycrystal $\alpha$-$Al_2O_3$" used in the specification means the crystal structure in which diffraction peaks from various crystal planes of $\alpha$-$Al_2O_3$ are observed in an X-ray diffraction of the composite material.

The term "without a colony" used in the specification means that there are no coarse polycrystalline grains or no grain boundary phases in the composite material when observed by photomicrography. The colony is a coarse grain or an area defined by a grain boundary phase.

In accordance with the first aspect of the present invention, there is provided a ceramic composite material consisting essentially of single crystal $\alpha$-$Al_2O_3$ and polycrystal YAG without a colony and having a three point bending strength at 1500° C. in air of at least 500 MPa.

Figure 1:
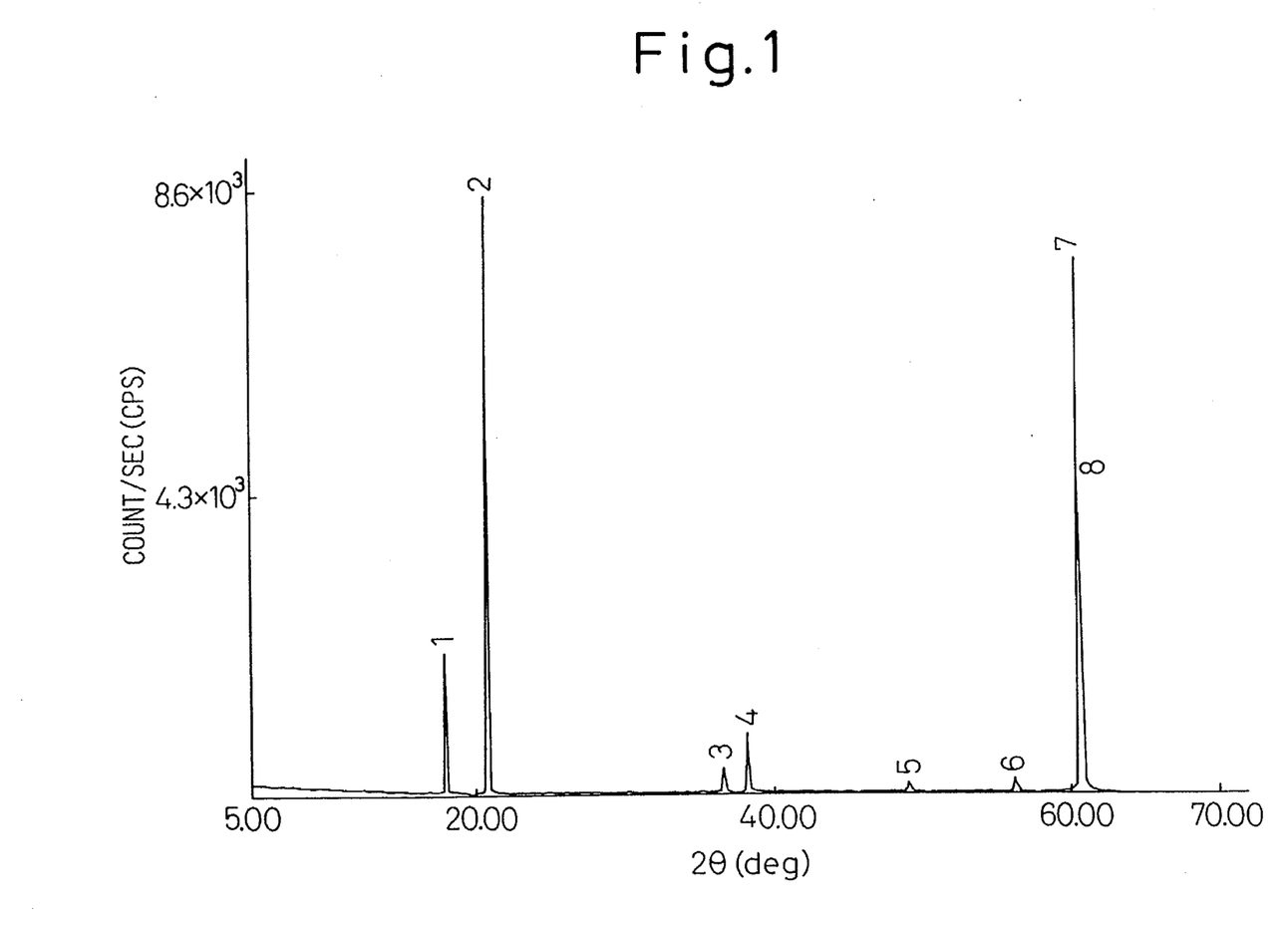
FIGS. 1 and 2 are X-ray diffraction patterns of the composite material obtained in Example 1.
Figure 2:
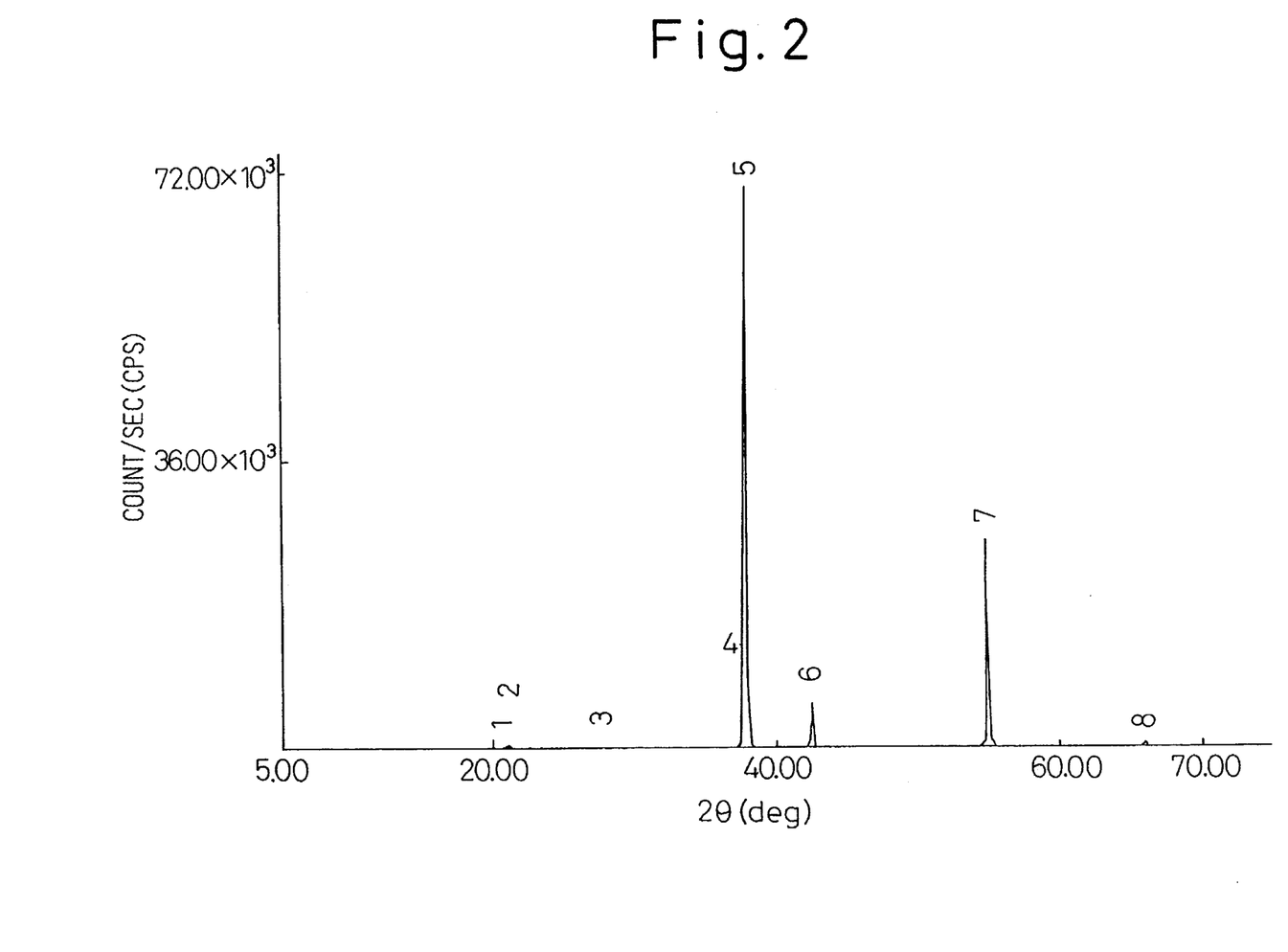

FIG. 1 is an X-ray diffraction pattern from a plane perpendicular to the solidification direction of the ceramic composite material prepared in Example 1, described later, and FIG. 2 is an X-ray diffraction pattern from a plane declined by about 81° from the solidification direction of the same ceramic composite material (no diffraction peak of $Al_2O_3$ was obtainable from an angle perpendicular to the solidification direction).

FIG. 1 shows diffraction peaks at $2\theta=18.06°$, 20.88°, 36.58°, 38.16°, 49.1°, 56.22° and 60.64° corresponding respectively to (211), (220), (422), (431), (541), (721) and (651) planes of YAG.

FIG. 2 shows for $Al_2O_3$ only a diffraction peak at $2\theta=37.8°$ corresponding to (110) plane and, for YAG, diffraction peaks at $2\theta=20$ 74°, 42.5°, 54.92° and 65.88° corresponding to (220), (440), (640) and (660) planes respectively.

The facts clearly indicate that the ceramic composite material of the first aspect of the present invention consists of single crystal $\alpha$-$Al_2O_3$ and polycrystal YAG.

Figure 3:
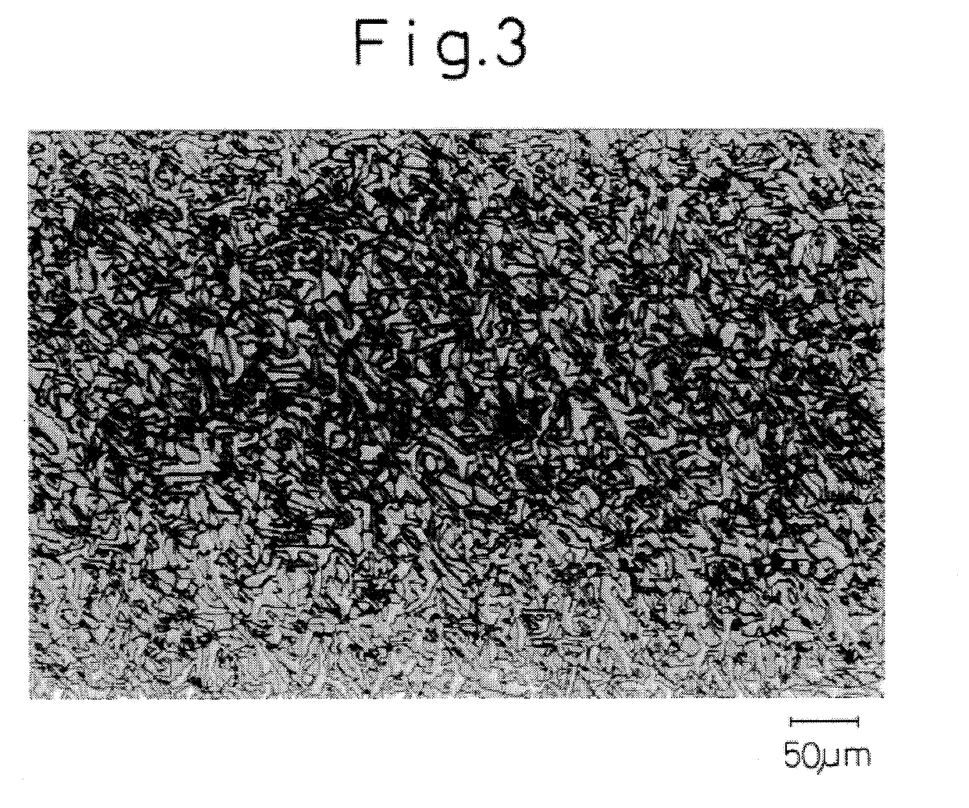
FIG. 3 is a photomicrograph of the composite material of Example 1.

FIG. 3 is a photomicrograph of the ceramic composite material obtained in Example 1, described later, in which no colony, grain boundary phase or coarse grain is observed, in contrast to FIGS. 1 and 2 of Parthasarathy et al.'s literature.

Figure 4:
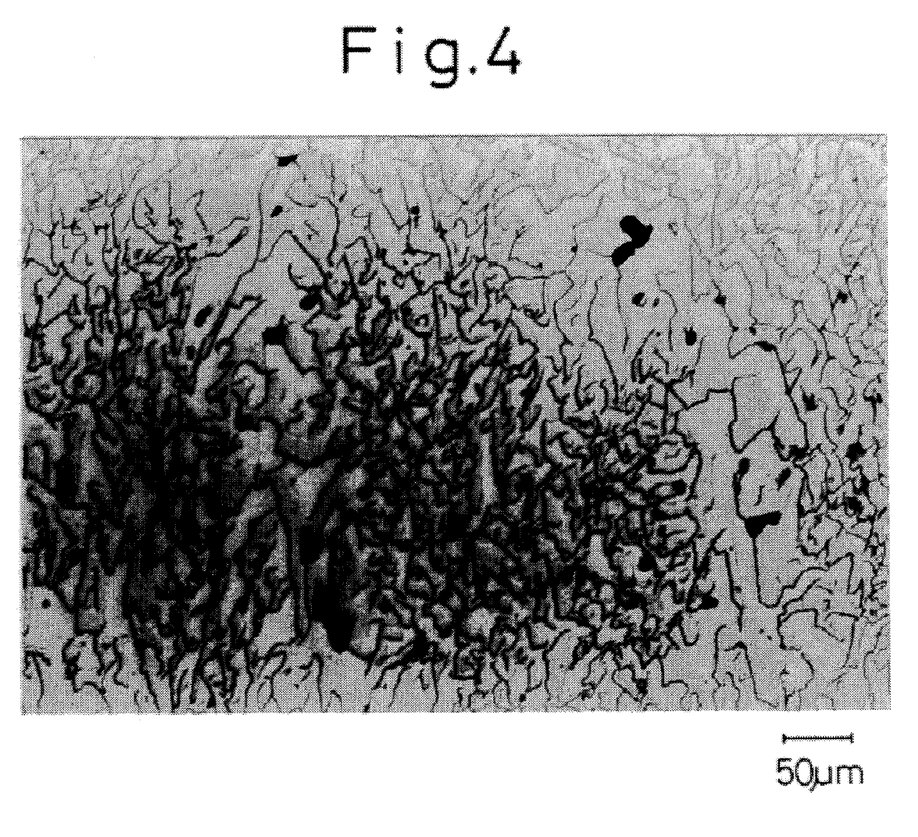
FIG. 4 is a photomicrograph of the composite material obtained in Comparative Example 1.

On the other hand, FIG. 4 is a photomicrograph of the ceramic composite material obtained in Comparative Example 1, in which colonies, grain boundary phases or coarse grains as shown in FIGS. 1 and 2 of Parthasarathy's literature are observed.

In the ceramic composite material of the first aspect of the present invention, the single crystal $\alpha\text{-}Al_2O_3$ and polycrystal YAG form a uniform sea/island structure when a cross-sectional microstructure is observed. It is not certain but is considered that the sea is single crystal $\alpha\text{-}Al_2O_3$ and the island is polycrystal YAG. The sizes of the sea and islands may be varied and controlled by selecting the solidification conditions, but are typically in a range of 5 to 50 μm.

The amounts of single crystal $\alpha\text{-}Al_2O_3$ and polycrystal YAG in the composite material of the first aspect of the present invention can be varied in ranges of about 20 to 80% by volume of single crystal $\alpha\text{-}Al_2O_3$ and about 80 to 20% by volume of polycrystal YAG, by changing the proportion between the $Al_2O_3$ and YAG starting powders. The eutectic composition is 55% by volume of $Al_2O_3$ and 45% by volume of YAG.

The ceramic composite material of the first aspect of the present invention has a three point bending strength at 1500° C. in air of at least 600 MPa and preferably has a compression creep strength at 1600° C. in air of at least 500 MPa.

In accordance with the second aspect of the present invention, there is provided a ceramic composite material consisting essentially of polycrystal $\alpha\text{-}Al_2O_3$ and polycrystal YAG without a colony and having a three point bending strength at 1500° C. in air and a compression creep strength at 1600° C. in air of at least 500 MPa.

Figure 5:
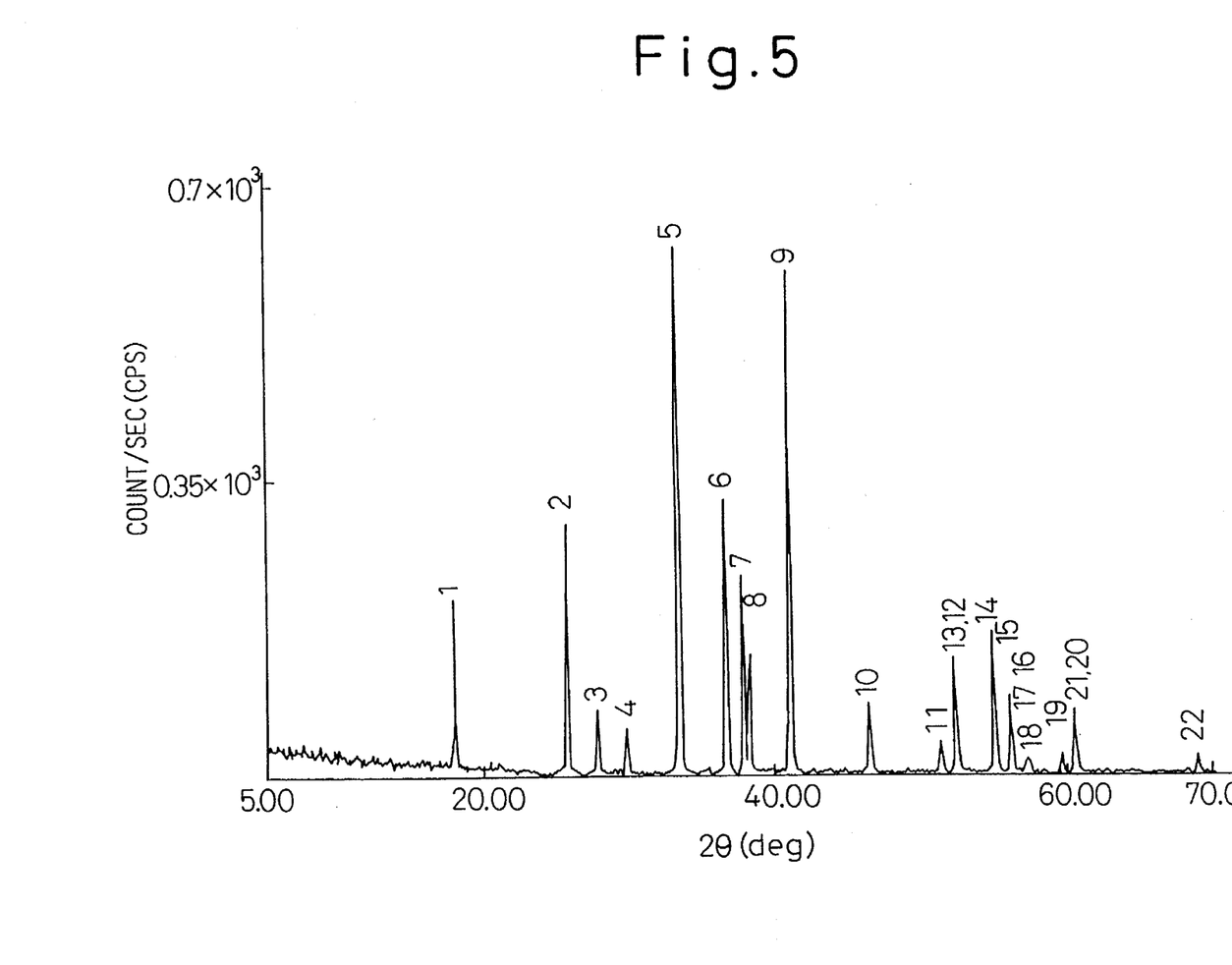
FIG. 5 is an X-ray diffraction pattern of the composite material obtained in Example 3.

FIG. 5 is an X-ray diffraction pattern from a plane perpendicular to the solidification direction of the ceramic composite material prepared in Example 3, described later.

FIG. 5 shows diffraction peaks at $2\theta=18.1°$, 27.8°, 29.78°, 33.26°, 36.63°, 38.22°, 41.18°, 46.62°, 51.6°, 55.28°, 56.26°, 60.7° and 69.06° corresponding to (211), (321), (400), (420), (422), (431), (521), (532), (631), (640), (721), (651) and (752) respectively, for YAG.

FIG. 4 also shows diffraction peaks at $2\theta=26.62°$, 37.78°, 52.7° and 59.78° corresponding to (012), (110), (024) and (211) planes of $Al_2O_3$.

These facts clearly indicate that the ceramic composite material of the present invention consists of polycrystal $\alpha\text{-}Al_2O_3$ and polycrystal YAG.

Figure 6:
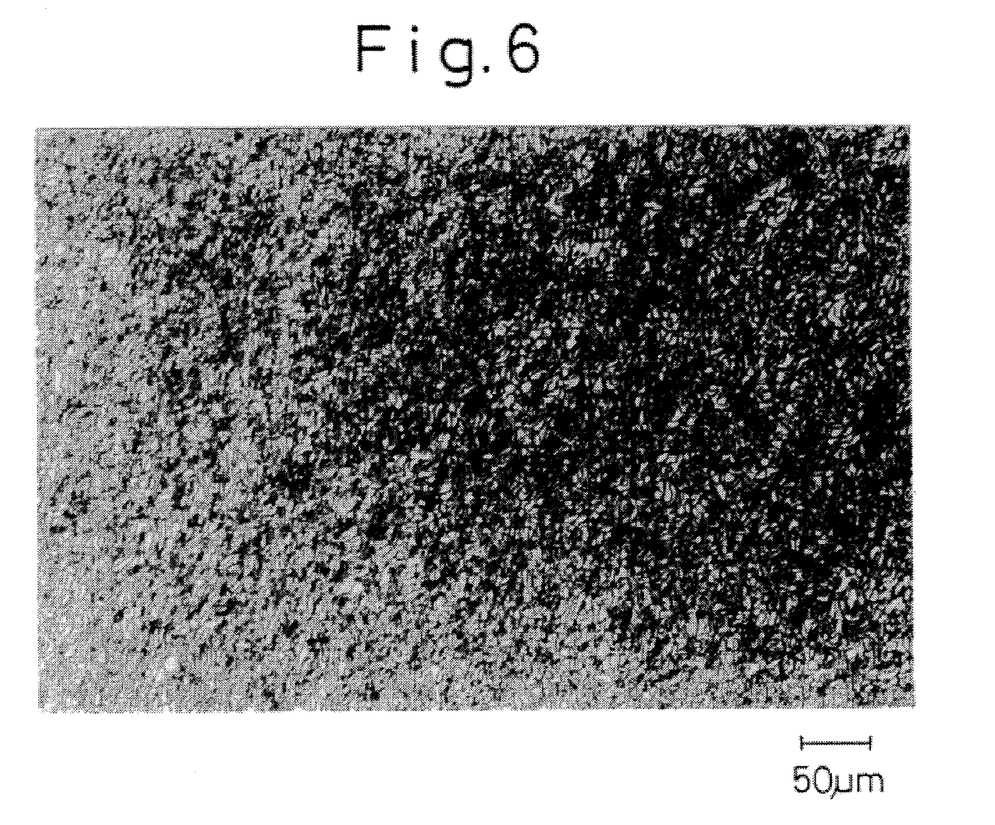
FIG. 6 is a photomicrograph of the composite material of Example 3.

FIG. 6 is a photomicrograph of the ceramic composite material obtained in Example 3, in which no colony, grain boundary phase or coarse grain is observed.

In the ceramic composite material of the second aspect of the present invention, the polycrystal $\alpha\text{-}Al_2O_3$ and polycrystal YAG form a uniform sea/island structure when a cross-sectional microstructure is observed. It is not certain but is considered that the sea is polycrystal $\alpha\text{-}Al_2O_3$ and the island is polycrystal YAG. The sizes of the sea and islands may be varied and controlled by selecting the solidification conditions, but are typically in a range of 1 to 50 μm.

The amounts of polycrystal $\alpha\text{-}Al_2O_3$ and polycrystal YAG in the composite material of the second aspect of the present invention can be varied in ranges of about 20 to 80% by volume of single crystal $\alpha\text{-}Al_2O_3$ and about 80 to 20% by volume of single crystal YAG, by changing the proportion between the $Al_2O_3$ and YAG starting powders. The eutectic composition is 55% by volume of $Al_2O_3$ and 45% by volume of YAG.

The ceramic composite material of the second aspect of the present invention has a three point bending strength at 1500° C. in air of at least 500 Ma and/or a compression creep strength at 1600° C. in air of at least 500 MPa.

The ceramic composite material of the present invention can be produced; for example, by the following process.

A mixed powder of $\alpha\text{-}Al_2O_3$ and $Y_2O_3$ powders in a ratio for a desired ceramic composite material is prepared by weighing and mixing. The mixing method is not particularly limited and may be either of a dry mixing method or a wet mixing method. In a wet mixing method, alcohol such as methanol and ethanol is generally used as a medium.

The mixed powder is then heated to a temperature at which both starting powders are molten, for example, at 1800 to 2500° C., in a conventional furnace, for example, an arc furnace to melt the mixed powder.

Subsequently, the melt is charged in a crucible and then unidirectionally solidified to prepare a ceramic composite material of the present invention. Alternatively, the melt is once solidified and crushed and the crushed material is then charged in a crucible and melted and unidirectionaly solidified.

The atmospheric pressure during the melting and solidification is generally $10^{-3}$ Torr or less, preferably $10^{-4}$ Torr or less. The speed of moving the crucible for unidirectional solidification, i.e., the rate of growth of the ceramic composite material is generally more than 50 mm/hour to 200 mm/hour for the ceramic composite material consisting essentially of single crystal $\alpha\text{-}Al_2O_3$ and polycrystal YAG of the first aspect of the present invention, and generally more than 200 mm/hour to 1000 mm/hour for the ceramic composite material consisting essentially of polycrystal $\alpha\text{-}Al_2O_3$ and polycrystal YAG of the second aspect of the present invention. The control of the conditions other than the atmospheric pressure and crucible moving speed can be done in the same manner as in conventional methods.

If the atmospheric pressure or the crucible moving speed during the melting and solidification is outside the above ranges, pores or voids tend to appear at colony boundaries, and it is difficult to obtain a composite material excellent in mechanical strength and creep behavior.

The apparatus for unidirectional solidification may be a conventional one in which a crucible is vertically movably mounted in a vertically arranged cylindrical container, an induction heating coil is disposed around the approximate center position of the cylindrical container, and a vacuum pump is provided to evacuate the container space.

EXAMPLES

EXAMPLE 1

$\alpha\text{-}Al_2O_3$ powder (Sumitomo Chemical Co., Ltd., AKP-30) and $Y_2O_3$ powder (Shin-etsu Chemical Co. Ltd., submicron type) in a molar ratio of 82% of the former to 18% of the latter were milled in a wet ball mill using ethanol. The obtained slurry was dried in a rotary evaporator to remove ethanol.

The obtained mixed powder of $\alpha\text{-}Al_2O_3$ and $Y_2O_3$ was charged in a crucible placed in a chamber, in which the atmospheric pressure was maintained at $10^{-5}$ Torr and the crucible was heated by an induction coil to 1850 to 1900° C. to melt the mixed powder in the crucible. Subsequently, unidirectional solidification was conducted by descending the crucible at a speed of 60 mm/hour under the above atmospheric pressure to obtain a ceramic composite material.

FIGS. 1 and 2 show X-ray diffraction patterns of the composite material obtained from planes perpendicular to and declined by about 81° from the solidification direction of the composite material. Diffraction peaks from polycrystal YAG are observed in FIG. 1 and only a diffraction peak from (110) plane of single crystal α-Al$_2$O$_3$ is observed in FIG. 2, which demonstrates that the above composite material consists of single crystal α-Al$_2$O$_3$ and polycrystal YAG.

FIG. 3 is a photomicrograph of the composite material. FIG. 3 demonstrates that the composite material does not include any colony or grain boundary phase, pores or voids do not exist, and a uniform sea/island structure is formed.

The mechanical strengths of the composite material are shown in Table 1, where the three point bending strength and compressive creep strength were measured in air.

This Composite material had a weight gain of 0.007 mg/cm$^3$ after kept at 1700° C. in air for 100 hours.

EXAMPLE 2

The procedures in Example 1 were repeated except the atmospheric pressure in the chamber and the descending speed of the crucible were changed to 1×10$^{-3}$ Torr and 100 mm/hour.

The X-ray diffraction patterns from the plane perpendicular to and declined by 9° from the direction of solidification of the composite material were the same as in FIG. 1, and in FIG. 2 respectively, indicating that the composite material consisted of single crystal α-Al$_2$O$_3$ and polycrystal YAG. A photomicrograph of this composite material showed that the composite material contains no colony or grain boundary phase, and no pores or voids, and forms a uniform sea/island structure.

The mechanical strengths of this composite material are shown in Table 1. The composite material had a weight gain of 0.007 mg/cm$^3$ after kept at 1700° C. in air for 100 hours.

COMPARATIVE EXAMPLE 1

The procedures of Example 1 were repeated except that the pressure in the chamber was normal or atmospheric pressure.

FIG. 4 shows a photomicrograph of the obtained ceramic composite material.

FIG. 4 shows that the composite material has colonies or grain boundary phases and voids.

The mechanical strengths of the composite material are shown in Table 1.

The composite material had a weight gain of 0.02 mg/cm$^3$ after kept at 1700° C. in air for 100 hours.

TABLE 1

|  | Example 1 | Example 2 | Comparative Example 1 |
|---|---|---|---|
| Three point bending strength (MPa) |  |  |  |
| at 1500° C. | 670 | 640 | 320 |
| at 1600° C. | 655 | 635 | 250 |
| at 1700° C. | 610 | 590 | 210 |
| Compressive creep strength at 1600° C. (MPa): |  |  |  |
| at Strain rate 1 × 10$^{-4}$ sec$^{-1}$ | 610 | 600 | 270 |
| at Strain rate 1 × 10$^{-5}$ sec$^{-1}$ | 570 | 550 | 210 |

EXAMPLE 3

The procedures of Example 1 were repeated except that the descending speed of the crucible was 220 mm/hour to obtain a ceramic composite material.

FIG. 5 is an X-ray diffraction pattern from the plane of the composite material perpendicular to the direction of solidification thereof. FIG. 5 shows diffraction peaks from polycrystal α-Al$_2$O$_3$ and polycrystal YAG, indicating that α-Al$_2$O$_3$ and YAG were polycrystals.

FIG. 6 is a photomicrograph of the composite material, in which no colony or grain boundary phase was observed and a uniform sea/island structure was formed.

The mechanical strengths of the composite material are shown in Table 2. In Table 2, the three point bending strength and the compression creep strength were measured in air.

The composite material had a weight gain of 0.004 mg/cm$^s$ after kept at 1700° C. in air for 100 hours.

EXAMPLE 4

The procedures in Example 1 were repeated except that the atmospheric pressure in the chamber and the descending speed of the crucible were changed to 10$^{-3}$ Torr and 300 mm/hour to obtain a ceramic composite material.

The X-ray diffraction pattern of the composite material from the plane perpendicular to the direction of solidification was the same as FIG. 5, indicating that the composite material consisted of polycrystal α-Al$_2$O$_3$ and polycrystal YAG.

In a photomicrograph of the composite material, no colony or grain boundary phase and no pore or void was observed, and a uniform sea/island structure was formed.

The mechanical strengths of the composite material are shown in Table 2.

The composite material had a weight gain of 0.005 mg/cm$^3$ after kept at 1700° C. in air for 100 hours.

COMPARATIVE EXAMPLE 2

The procedures of Example 3 were repeated except that the pressure in the chamber was normal or atmospheric pressure.

Figure 7:
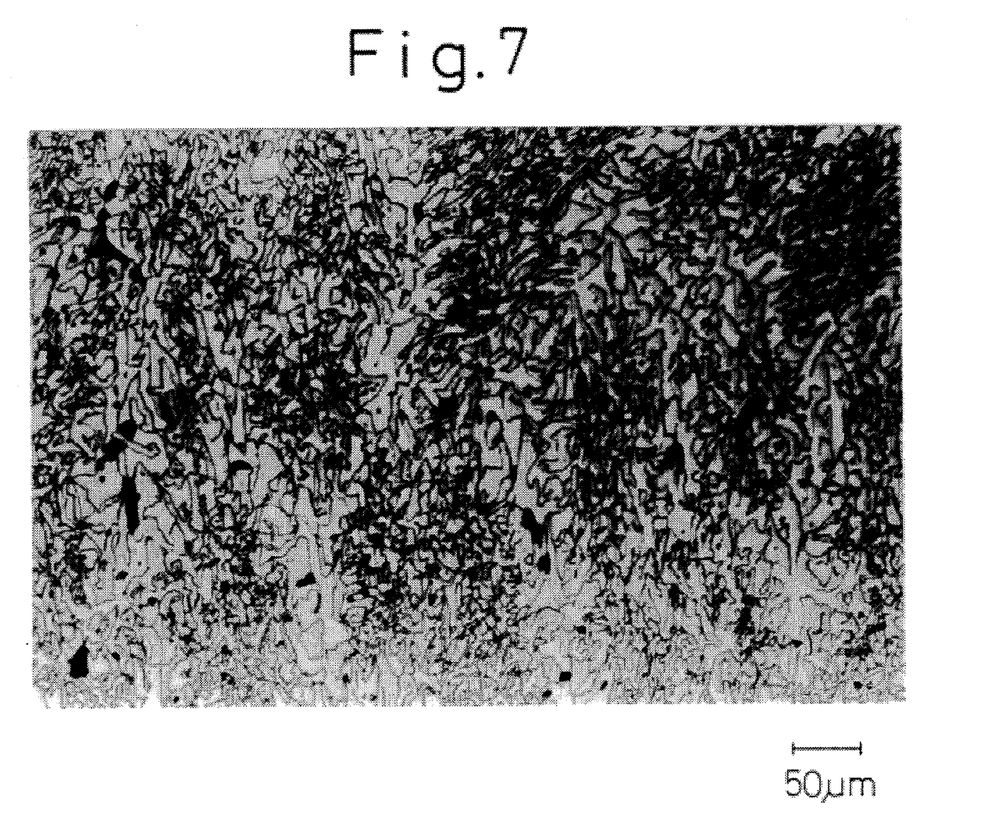
FIG. 7 is a photomicrograph of the composite material of Comparative Example 2.

FIG. 7 is a photomicrograph of the obtained ceramic composite material.

FIG. 7 shows that the composite material has colonies or grain boundary phases and voids.

The mechanical strengths of the composite material are shown in Table 2.

The composite material had a weight gain of 0.005 mg/cm$^3$ after kept at 1700° C. in air for 100 hours.

TABLE 2

|  | Example 3 | Example 4 | Comparative Example 2 |
|---|---|---|---|
| Three point bending strength (MPa) |  |  |  |
| at 1500° C. | 550 | 530 | 320 |
| at 1600° C. | 510 | 490 | 250 |
| at 1700° C. | 480 | 450 | 210 |
| Compressive creep strength at 1600° C. (MPa): |  |  |  |
| at Strain rate 1 × 10$^{-4}$ sec$^{-1}$ | 600 | 590 | 270 |
| at Strain rate 1 × 10$^{-5}$ sec$^{-1}$ | 540 | 520 | 210 |

We claim:
1. A ceramic composite material consisting essentially of 20 to 80% by volume of polycrystal α-Al$_2$O$_3$ and 80 to 20% by volume of polycrystal Y$_3$Al$_5$O$_{12}$ without a colony and having a three point bending strength at 1500° C. in air of at least 600 MPa and/or a compression creep strength at 1600° C. in air of at least 500 MPa.

2. A ceramic composite material according to claim 1 wherein said single crystal $\alpha$-$Al_2O_3$ and said polycrystal $Y_3Al_5O_{12}$ form a uniform sea/island structure in which sea and islands have a size of 5 to 50 μm.

3. A ceramic composite material according to claim 1 wherein said composite material does not include pores or voids.

4. A ceramic composite material consisting essentially of 20 to 80% by volume of polycrystal $\alpha$-$Al_2O_3$ and 80 to 20% by volume of polycrystal $Y_3Al_5O_{12}$ without a colony and having a three point bending strength at 1500° C. in air of at least 500 MPa.

5. A ceramic composite material according to claim 4 wherein said polycrystal $\alpha$-$Al_2O_3$ and the polycrystal $Y_3Al_5O_{12}$ form a uniform sea/island structure in which sea and islands have a size of 1 to 50 μm.

6. A ceramic composite material according to claim 4 wherein said composite material does not include pores and voids.

7. A ceramic composite material according to claim 4 wherein said composite material has a compression creep strength at 1600° C. in air of at least 500 MPa.

* * * * *